(12) United States Patent
Chalcraft et al.

(10) Patent No.: US 6,599,115 B2
(45) Date of Patent: Jul. 29, 2003

(54) MOLD UNSCREWING MECHANISM FOR MAKING THREADED ARTICLES

(75) Inventors: Albert Chalcraft, Seminole, FL (US); Charles Doerner, Clearwater, FL (US); Gerald Seidelman, Palm Harbor, FL (US); Arthur Luther, Largo, FL (US); Kent A. Louviere, Lafayette, LA (US)

(73) Assignee: Precise Technology, Inc., North Versailles, PA (US)

( * ) Notice: Subject to any disclaimer, the term of this patent is extended or adjusted under 35 U.S.C. 154(b) by 0 days.

(21) Appl. No.: 09/850,038

(22) Filed: May 7, 2001

(65) Prior Publication Data

US 2002/0164393 A1 Nov. 7, 2002

(51) Int. Cl.[7] .............................................. B29C 45/44
(52) U.S. Cl. ....................... 425/556; 264/334; 425/438; 425/577; 425/809; 425/DIG. 58
(58) Field of Search ................................ 425/556, 577, 425/809, DIG. 58, 438; 264/334

(56) References Cited

U.S. PATENT DOCUMENTS

| | | | |
|---|---|---|---|
| 1,916,692 A | * | 7/1933 | Scribner ...................... 425/809 |
| 2,339,443 A | * | 1/1944 | Wilson ........................ 425/577 |
| 2,363,808 A | | 11/1944 | Sayre |
| 2,558,027 A | | 6/1951 | Wilson |
| 2,799,049 A | | 7/1957 | Wilson |
| 3,664,212 A | | 5/1972 | Hehl |
| 3,719,446 A | | 3/1973 | Cleevely |
| 3,776,676 A | * | 12/1973 | Kessler ....................... 425/556 |
| 3,905,416 A | | 9/1975 | Hammer |
| 4,240,498 A | | 12/1980 | Frenette |
| 4,767,587 A | | 8/1988 | Towns et al. |
| 4,958,676 A | | 9/1990 | Kuntz |
| 5,061,168 A | | 10/1991 | Fox |
| 5,383,780 A | * | 1/1995 | McCready et al. ......... 425/556 |
| 5,518,679 A | | 5/1996 | Junk |
| 5,558,887 A | | 9/1996 | Skufca et al. |
| 5,776,521 A | | 7/1998 | Wright et al. |

OTHER PUBLICATIONS

Frederick J. Bueche, introduction to physics for scientists and engineers, 1975, McGraw–Hill, 2$^{nd}$ edition, pp. 157, 158.*

* cited by examiner

Primary Examiner—Tim Heitbrink
(74) Attorney, Agent, or Firm—Dennis G. LaPointe

(57) ABSTRACT

An unscrewing mechanism for forming threaded components includes at least one rotatable elongate mold core having a threaded portion at one end for molding a threaded component, a stripper plate that is separable from a stationary plate and underlying a cavity plate in which is integrated a mating mold cavity, and a drive gear with a jack screw at one end and with gear teeth that mesh with mating gear teeth on the mold core for rotating the mold core such that a movement of the stripper plate away from the stationary plate for ejecting a formed threaded component is at the same rate as the unscrewing of the mold core. The jack screw is threaded such that a riser component pushes the stripper plate at the same rate that the mold core is unscrewing.

15 Claims, 15 Drawing Sheets

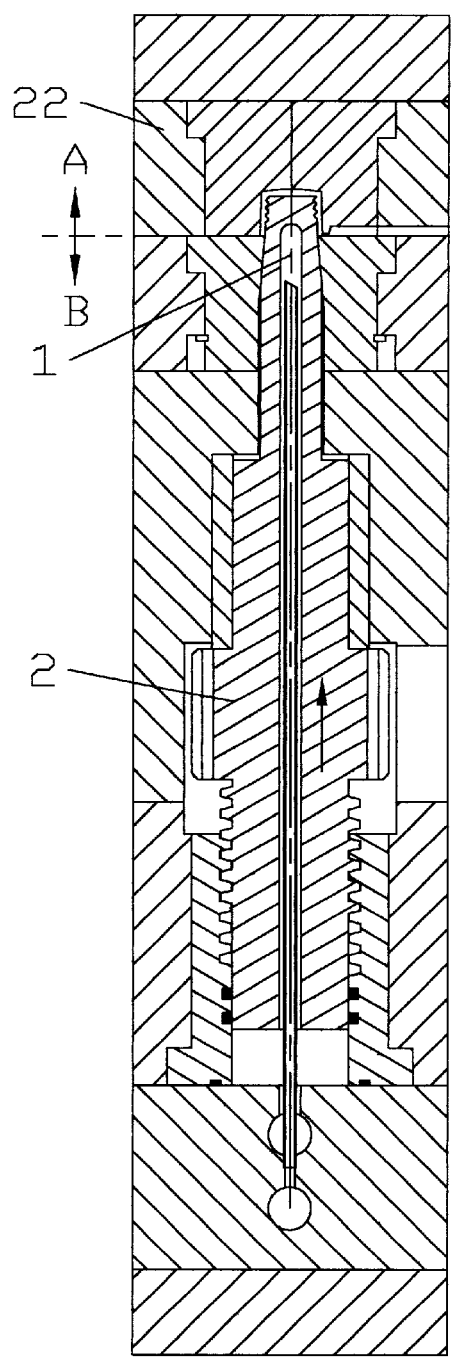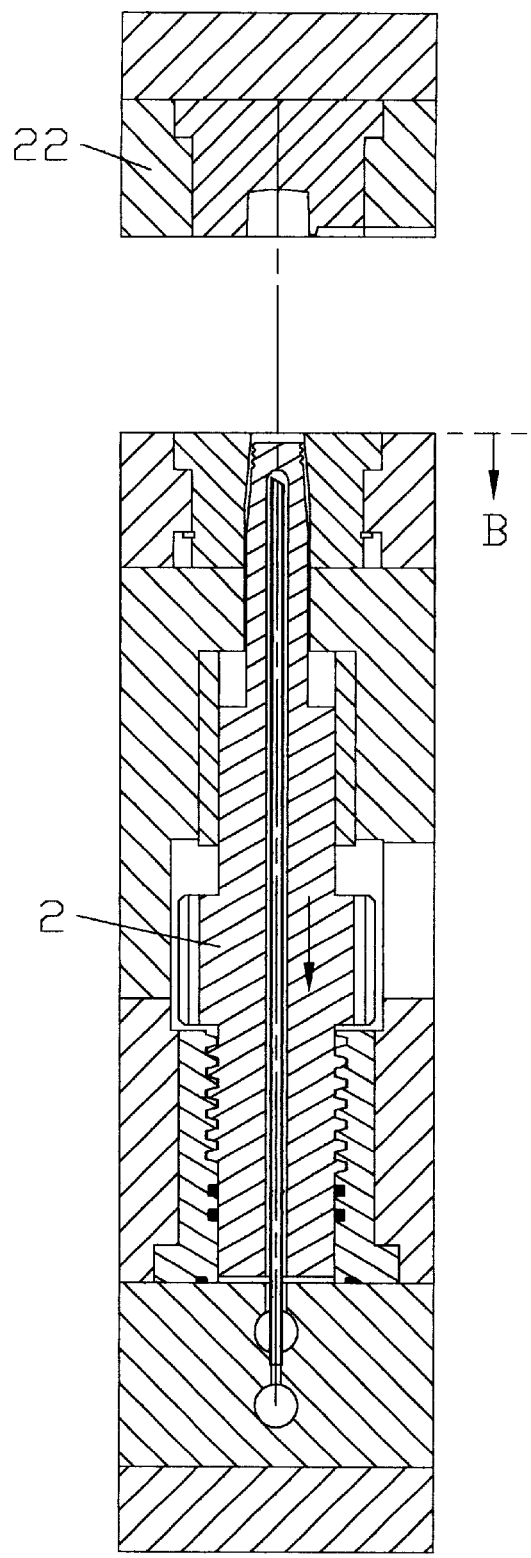
FIG. 1a
PRIOR ART
FIG. 1b
PRIOR ART

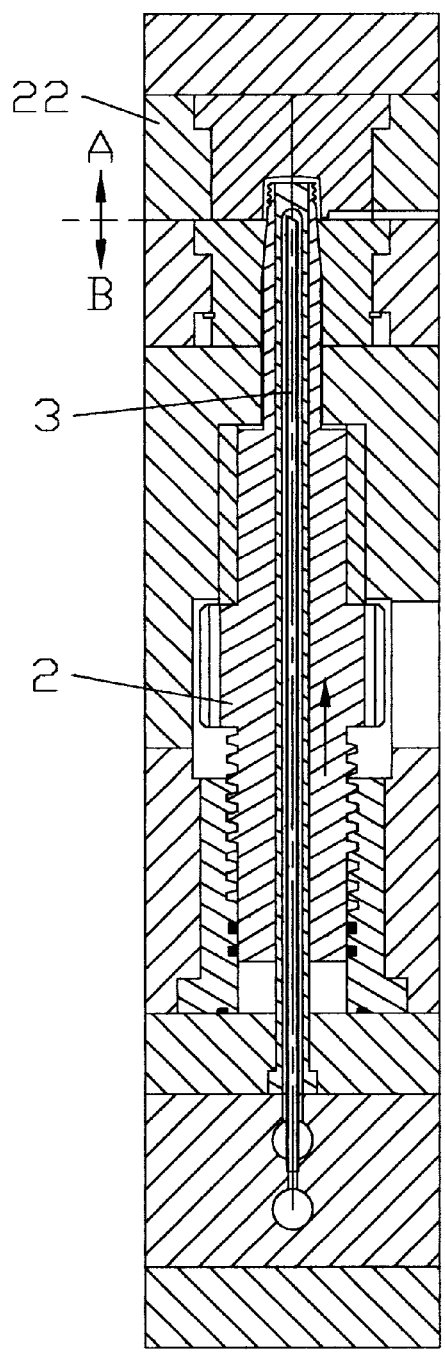
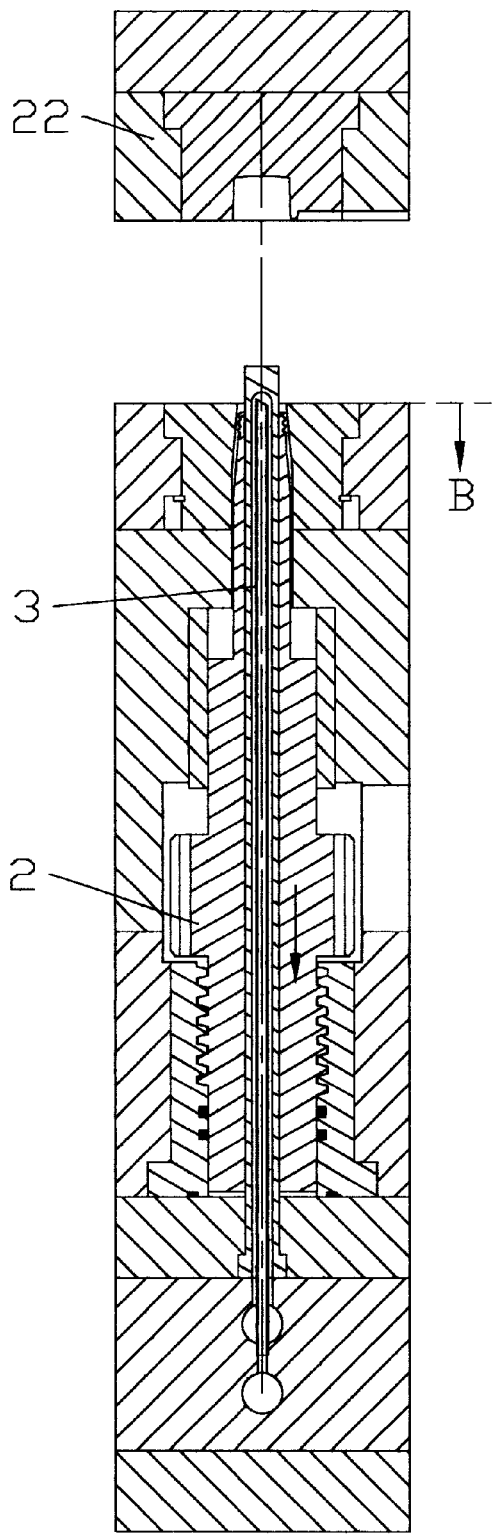
FIG. 1c
PRIOR ART
FIG. 1d
PRIOR ART

MOLD UNSCREWING MECHANISM FOR MAKING THREADED ARTICLES

BACKGROUND OF THE INVENTION

1. Field of the Invention

The invention relates to an unscrewing mechanism in an injection molding apparatus for forming threaded molded articles such as caps.

2. Description of Related Art

Methods, and in particular, apparatus or mechanisms for forming threaded molded articles in an injection molding operations are known in the art.

Known related art includes the apparatus depicted in U.S. Pat. No. 5,776,521 to Wright et al. This patent discloses a method of ejecting the molded part by rotating the ejector sleeve as it follows the part up and off the core. Other methods or devices are depicted in U.S. Pat. Nos. 2,558,027 and 2,799,049 to Wilson. The former Wilson patent discloses the use of adjustable spring pressure for the movement of the stripper plate. The molded thread is what gages the stripper plate movement as it is unscrewed. The latter Wilson patent discloses a method of anti-rotation designed by sinking the product head with ratchet teeth on the outside diameter into the stripper plate side and uses the adjustable spring pressure technology disclosed in the former patent to activate the stripper plate.

Other known related methods and mechanisms for making molded threaded articles include U.S. Pat. No. 5,518,679 to Junk, U.S. Pat. No. 5,061,168 to Fox, and U.S. Pat. No. 4,767,587 to Town.

Many of the prior art devices have inherent problems such as complexity, cooling problems associated with the inherent design, wear problems to bushings and seals due to the design of the mechanisms, and similar problems associated with the inherent complex designs of such mechanisms.

For example, as shown in prior art drawing FIGS. 1*a* and 1*b*, the cooling of plastic is done faster through the use of a non-elevating or laterally rotating core 2. Water bubblers can maintain optimum space 1 at the internal tip of the core to maximize cooling. There is no movable stripper plate or stripper plate action as contemplated by the present invention. An object of the present invention would provide an unscrewing core that rotates but remains in position such that a water bubbler can maintain an optimum space 1 at the internal tip of the core 2.

Another example of current practice is unscrewing the core from the plastic cap into a threaded chase. This requires the core to move laterally as it rotates following the thread pitch being molded. The core's alignment is by means of metallic bearing material (bronze) in a friction condition. The present invention reduces wear with the use of ball or roller bearings on a stationary rotating core.

FIGS. 1*c* and 1*d* again depict another prior art configuration with an inner core wherein the outer thread shell backs out of a stripper ring; there is no stripper plate action; the inner core 3 is stationary; and there is no cooling the threaded core shell 2.

The present invention also saves cycle time. As the mold opens, the core and striper plate will move in unison for part ejection, a process which may be called ejection on the fly. In addition, fewer manufactured components are needed in the cavity stack for the present invention thereby providing a simplified assembly with reduced maintenance requirements.

SUMMARY OF THE INVENTION

The present invention is an unscrewing mechanism for forming threaded components comprising at least one rotatable elongate mold core which has a threaded portion at one end for molding one of an external thread, an internal thread and a combination thereof for a threaded component to be formed. Also included is a mating mold surrounding a portion of each of the at least one rotatable elongate mold core including the threaded portion when in a mold closed condition therein defining a mold cavity between said at least one rotatable elongate mold core and said mating mold into which molten material is injected to form the threaded component.

The mating mold is a portion of a cavity plate and independently movable relative to said at least one rotatable elongate mold core to a mold open condition when said mating mold is spaced from the at least one rotatable elongate mold core.

A stripper plate is provided in overlying relationship to a stationary plate. The stripper plate is movable and separable from the stationary plate in a direction parallel to an axial direction of the at least one rotatable elongate mold core for ejecting the formed threaded component when in the mold open condition, the stripper plate further being in underlying relationship to said cavity plate when in the mold closed condition.

Means for moving the stripper plate in the direction parallel to the axial direction of the at least one rotatable elongate mold core is provided, the means further being for rotating the at least one rotatable elongate mold core such that a movement of the stripper plate to eject the formed threaded component is at the same rate as the unscrewing of the at least one rotatable elongate mold core threaded portion.

The means for moving the stripper plate includes jack screw means, the jack screw means being threaded and metered so that the stripper plate is moved to eject the formed threaded component at the same rate that the threaded portion of the at least one rotatable elongate mold core unscrews. The jack screw means comprises a riser component, the riser component being in a slidable relationship with the stationary plate; and means for preventing the riser component from rotating as it moves the stripper plate away from the stationary plate and as it moves to allow the stripper plate to return for molding another threaded component.

The means for preventing the riser component from rotating comprises at least one flat portion along its outside perimeter, the flat portion being juxtaposed a mating flat portion in the stationary plate.

In another embodiment, the jack screw means comprises a riser component; a riser chase component surrounding said riser component, said riser component being in a slidable relationship with the riser chase component, the riser chase component being fixed thereto; and means for preventing the riser component from rotating as it moves the stripper plate away from the stationary plate to for ejecting the formed threaded component and as it moves to allow the stripper plate to return for molding another threaded component. In this embodiment, the means for preventing the riser component from rotating comprises at least one flat portion along its outside perimeter, the flat portion being juxtaposed a mating flat portion in the riser chase component.

The unscrewing mechanism for forming threaded components further comprising a fixed core cooling plate; and a bottom bearing plate in overlying relationship to the fixed core cooling plate and fastened to said fixed core cooling plate. The stationary plate is in overlying relationship to the bottom bearing plate and fastened to said bottom bearing plate; and the at least one rotatable elongate mold core is disposed on the fixed core cooling plate at one end and extends therefrom through an aperture in each of the bottom bearing plate, the stationary plate and the stripper plate such that the threaded portion extends beyond an upper surface of the stripper plate when said stripper plate is in condition for molding another threaded component and the threaded portion engages the mating mold in the cavity plate so as to define the mold cavity.

Bearing means in each of the stationary plate and bottom bearing plate through which the at least one rotatable elongate mold core extends is provided for facilitating a rotating action of the at least one rotatable elongate mold core in a clockwise and counter-clockwise rotation.

The at least one rotatable elongate mold core further comprises longitudinal gear teeth around a perimeter of an intermediate portion of said at least one rotatable elongate mold core.

The means for moving the stripper plate further includes an elongate drive gear, which is parallel to the at least one rotatable elongate mold core. The elongate drive gear has longitudinal gear teeth around a perimeter of an intermediate portion of said elongate drive gear. The longitudinal gear teeth of the elongate drive gear are in cooperative gear teeth mesh engagement with the mating longitudinal gear teeth of the at least one rotatable elongate mold core. Also provided is means for driving the elongate drive gear so as to cause clockwise and counter-clockwise rotation such that when the elongate drive gear is made to rotate clockwise, the at least one rotatable elongate mold core rotates counter-clockwise, and when the elongate drive gear is made to rotate counter-clockwise, the at least one rotatable elongate mold core rotates clockwise.

BRIEF DESCRIPTION OF THE DRAWINGS

For a fuller understanding of the nature and objects of the invention, reference should be made to the following detailed description, taken in connection with the accompanying drawings, in which:

FIG. 1a is a depiction of a current prior art practice using a solid core in a mold closed condition;

FIG. 1b is a depiction of a current prior art practice using a solid core in a mold open condition;

FIG. 1c is another depiction of a current prior art practice with an inner core in a mold closed condition;

FIG. 1d is the prior art embodiment of FIG. 1c in a mold open condition;

DETAILED DESCRIPTION OF THE INVENTION

Figure 2A:
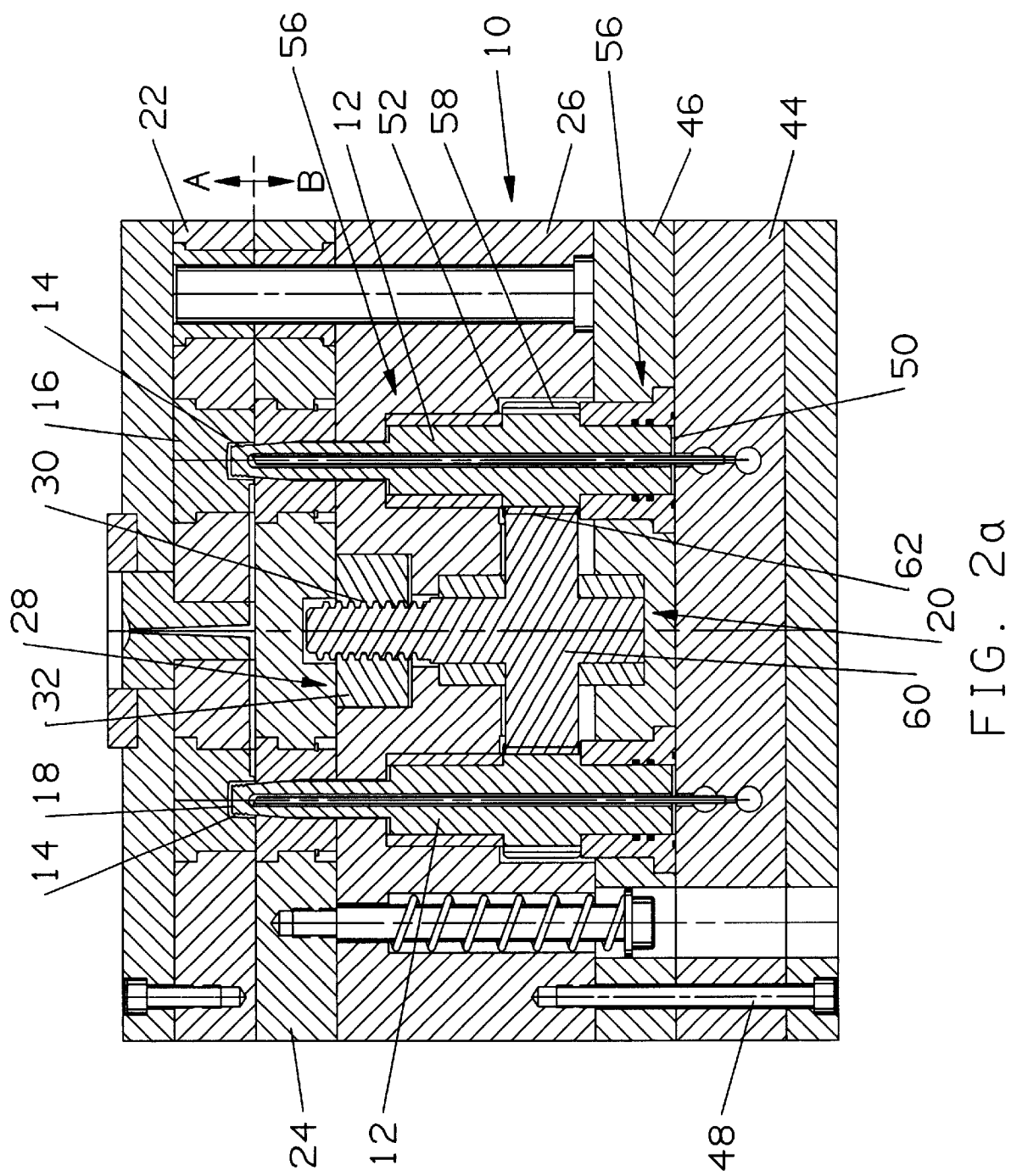
FIG. 2a is a cross-section view of the present invention depicted in the mold closed condition wherein an internal threaded component may be molded.

Referring now to the drawings, in particular FIGS. 2a–2d, the present invention is an unscrewing mechanism for forming threaded components, and is generally depicted as 10, comprises at least one rotatable elongate mold core 12 which has a threaded portion 14 at one end for molding one of an external thread, an internal thread and a combination thereof for a threaded component 72 to be formed. Also included is a mating mold 16 surrounding a portion of each of the at least one rotatable elongate mold core 12 including the threaded portion 14 when in a mold closed condition, as depicted in FIG. 2a, therein defining a mold cavity 18 between said at least one rotatable elongate mold core 12 and said mating mold 16 into which molten material is injected to form the threaded component 72.

Figure 2B:
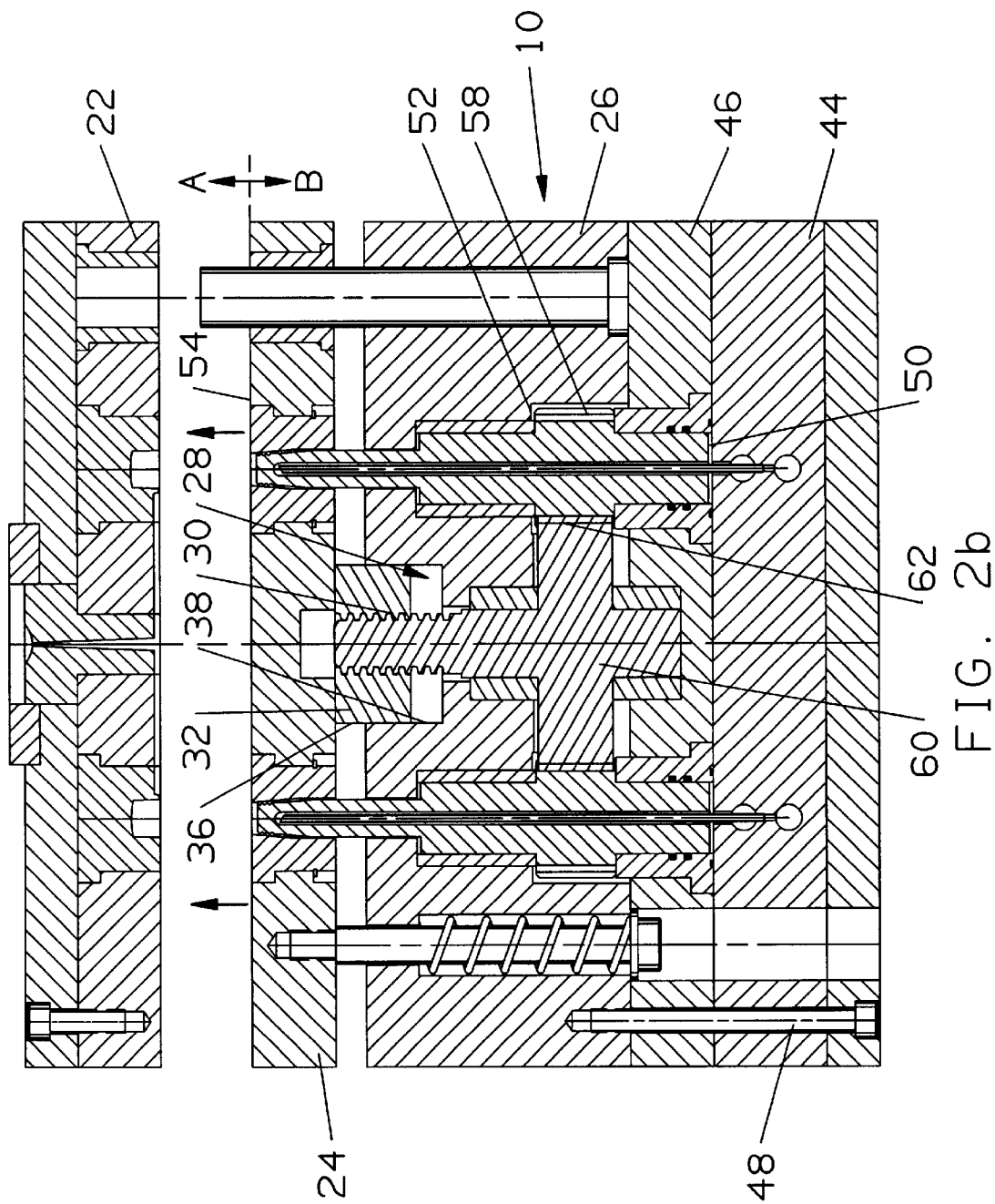
FIG. 2b is a cross-section view of the present invention embodiment depicted in FIG. 2a in a mold open condition.
Figure 2C:
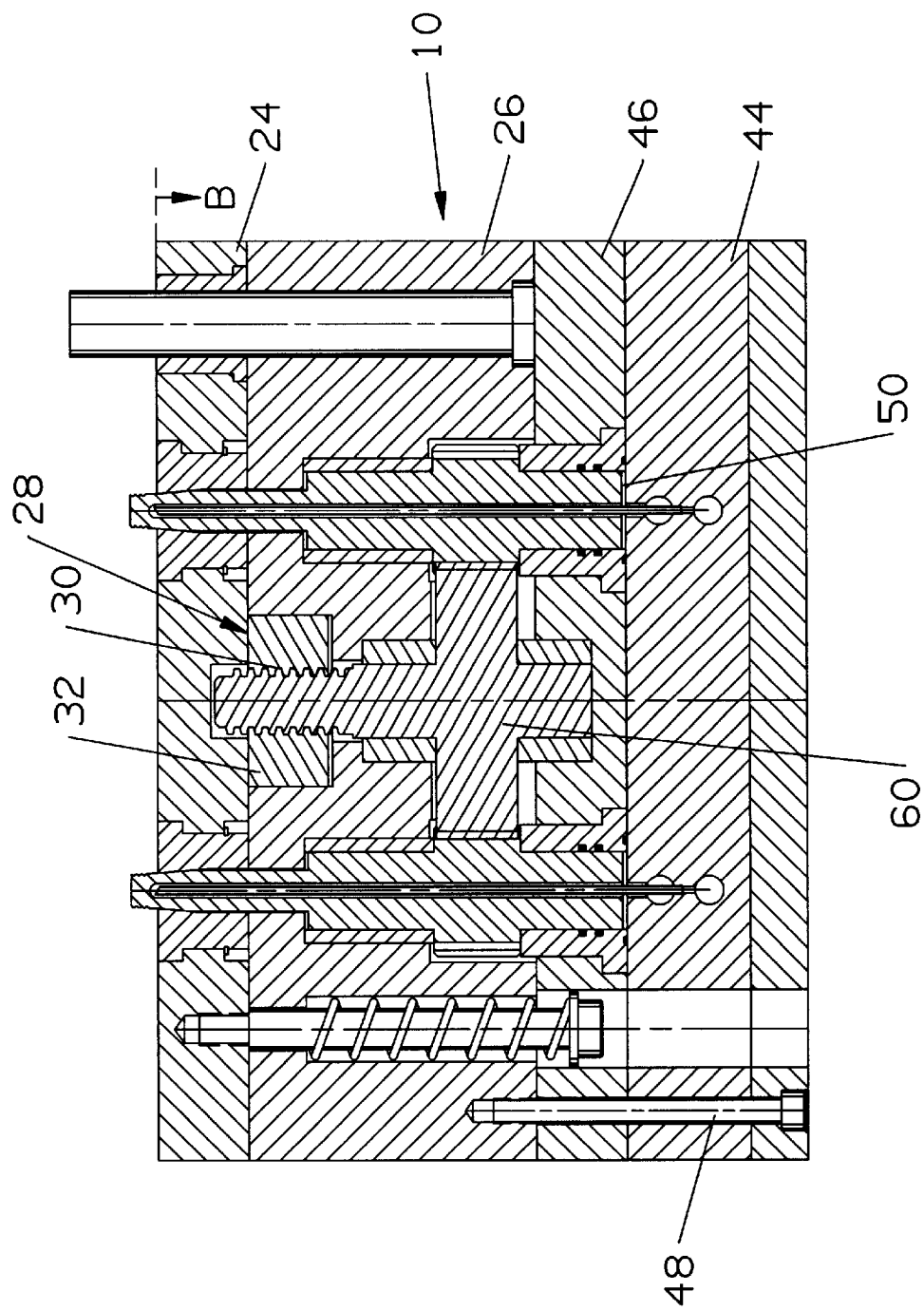
FIG. 2c is a cross-section view of the embodiment depicted in FIG. 2a without the cavity plate.
Figure 2D:
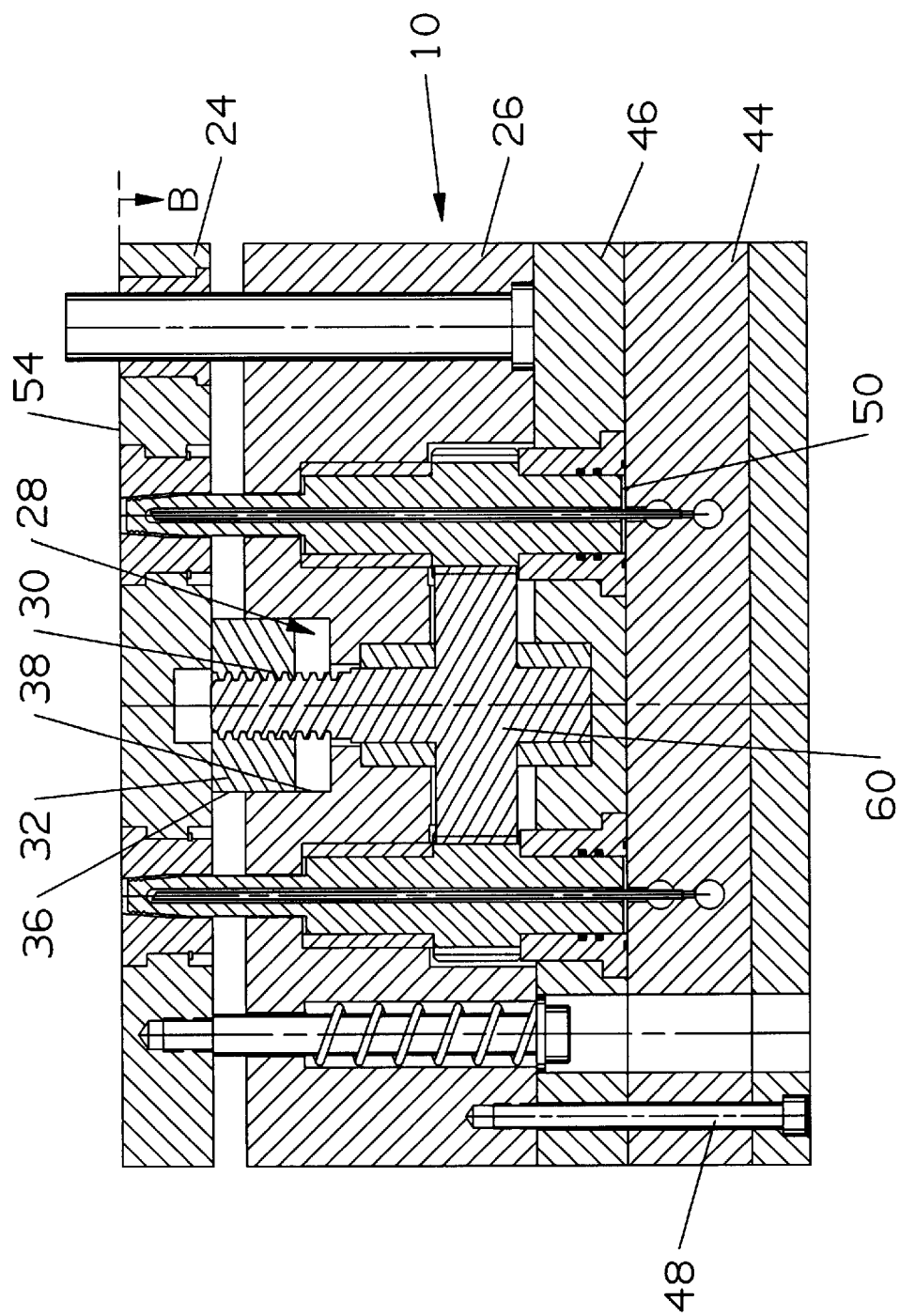
FIG. 2d is a cross-sectional view of the embodiment of FIG. 2b without the cavity plate.
Figure 3A:
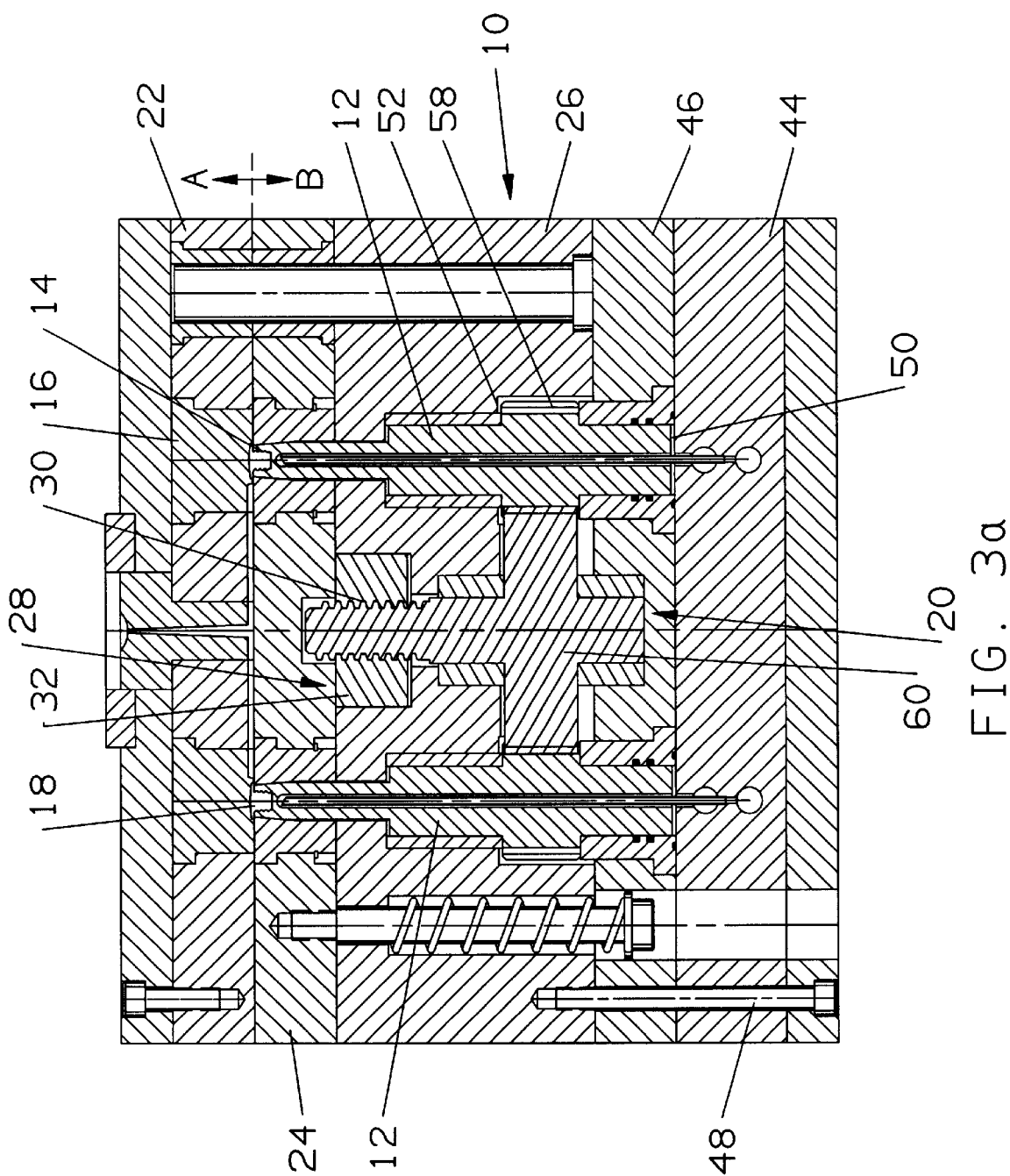
FIG. 3a is a cross-section view of another embodiment depicting the invention in a mold closed condition and wherein an externally threaded component may be molded.
Figure 3B:
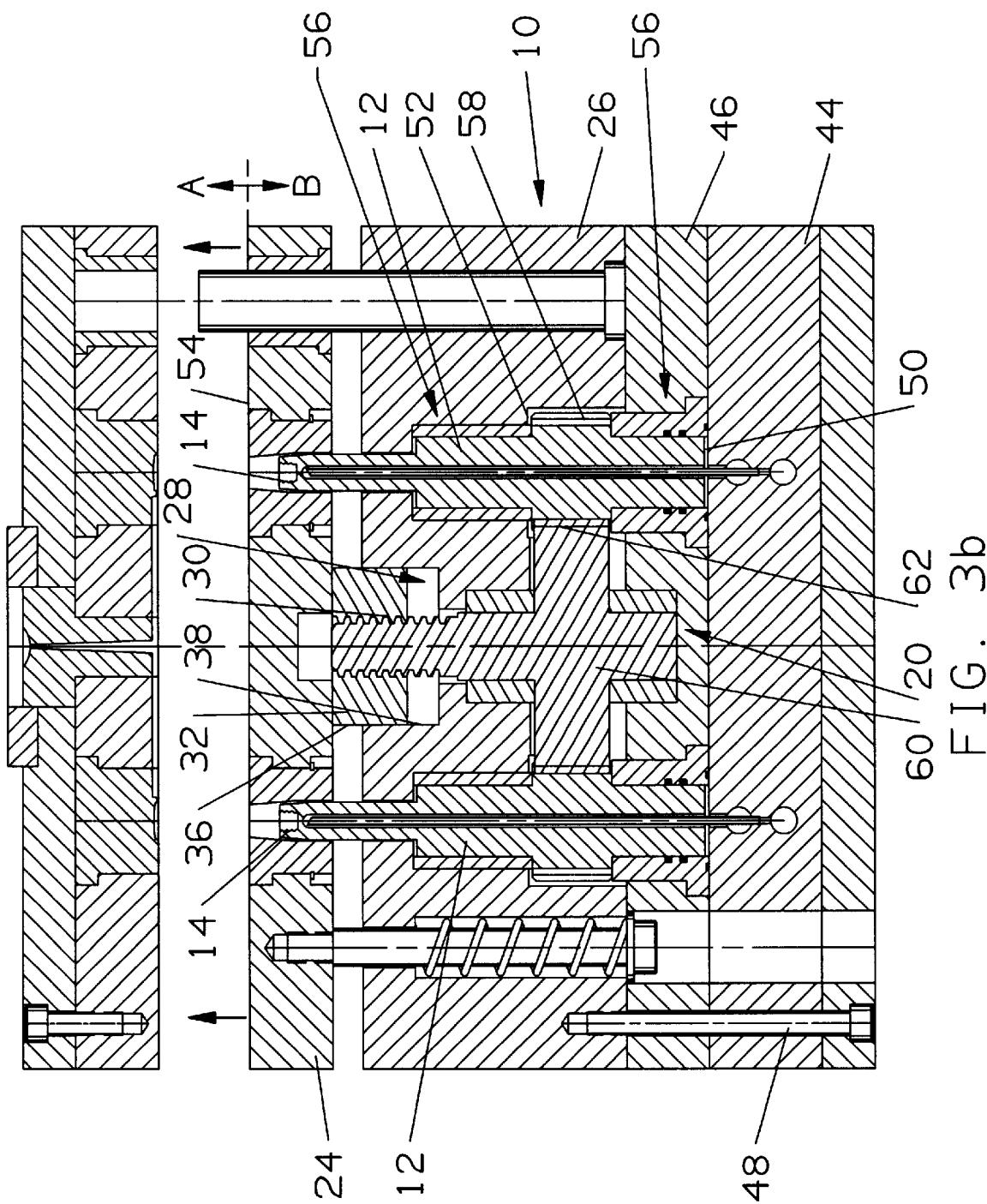
FIG. 3b is a cross-section view of the embodiment of FIG. 3a depicting the invention in a mold open condition.

FIGS. 3a and 3b depict the same embodiment of the invention, as depicted in FIGS. 2a and 2b, with the exception that FIGS. 2a and 2b provide an example of making treaded components with an internal thread while FIGS. 3a and 3b depict the making of a threaded component with an external threaded. As one can readily see from the depiction of the threaded portion 14 of the rotatable elongate mold core 12, one skilled in the art could readily configure a threaded portion 14 such that the invention 10 could make a threaded component 72 with both an internal and an external thread.

As one can surmise by the cross-sectional views of the invention 10 as depicted in FIGS. 2a–2d and 3a–3b, several rotatable elongate mold cores 12 can be arranged around the means 20 for rotating the rotatable elongate mold core 12, said means 20 further described below, so that one, two, three, four, . . . , eight, . . . , twelve, through almost any other practical number of desired rotatable elongate mold cores 12 may be configured for the mass production of threaded plastic components 72.

The mating mold 16 is a portion of a cavity plate 22 and independently movable relative to said at least one rotatable elongate mold core 12 to a mold open condition, as shown in FIGS. 2b and 3b, when said mating mold 16 is spaced from the at least one rotatable elongate mold core 12.

A stripper plate 24 is provided in overlying relationship to a stationary plate 26. The stripper plate 24 is movable and separable from the stationary plate 26 in a direction parallel to an axial direction of the at least one rotatable elongate mold core 12, as shown by directional arrows in FIGS. 2b and 3b, for ejecting the formed threaded component 72 when in the mold open condition, the stripper plate 24 further being in underlying relationship to the cavity plate 22 when in the mold closed condition. FIGS. 2a–2d and 3a–3b show the "A" side of the molding equipment which is also called the stationary side. This side includes the cavity plate 22. Also shown is the "B" side of the molding equipment, which is also called the movable side in the industry. This "B" side includes the stripper plate 24 and the other underlying components depicted in the drawings.

As alluded to above, means 20 for moving the stripper plate in the direction parallel to the axial direction of the at least one rotatable elongate mold core 12 is provided. The means 20 further being for rotating the at least one rotatable elongate mold core 12 such that a movement of the stripper plate 24 to eject the formed threaded component 72 is at the same rate as the unscrewing of the at least one rotatable elongate mold core threaded portion 14.

The means 20 for moving the stripper plate 24 includes jack screw means 28, the jack screw means 28 being threaded and metered (see 30) so that the stripper plate 24 is moved to eject the formed threaded component 72 at the same rate that the threaded portion 14 of the at least one rotatable elongate mold core 12 unscrews. The jack screw means 28 comprises a riser component 32, the riser component 32 being in a slidable relationship with the stationary plate 26; and means 34 for preventing the riser component 32 from rotating as it moves the stripper plate 24 away from the stationary plate 26 and as it moves to allow the stripper plate 24 to return for molding another threaded component 72.

The means 34 for preventing the riser component 32 from rotating comprises at least one flat portion 36 along its outside perimeter, the flat portion 36 being juxtaposed a mating flat portion 38 in the stationary plate 26.

Figure 4B:
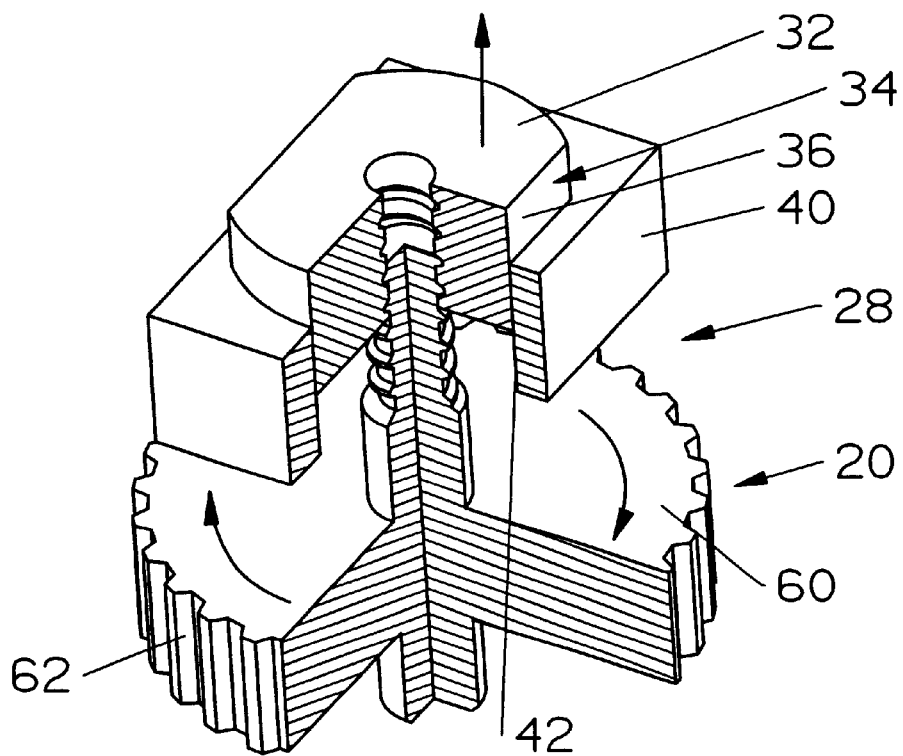
FIG. 4b is a partial cross-sectional view of the means for moving the stripper plate and for rotating the rotatable elongate mold core as well as the jack screw means when the invention is in a mold open condition.
Figure 4A:
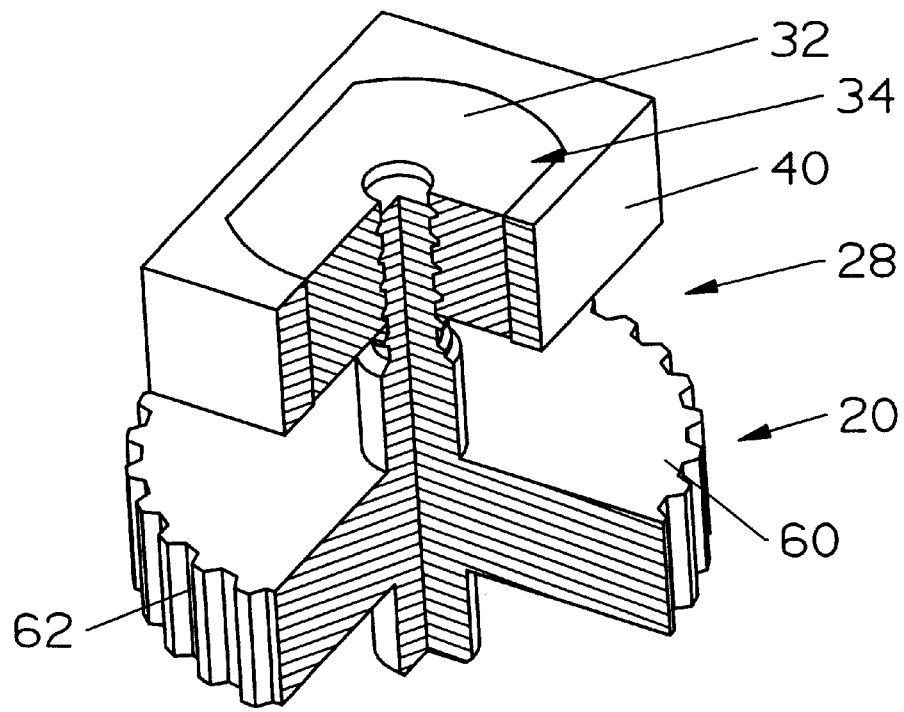
FIG. 4a is a partial cross-sectional view of the means for moving the stripper plate and for rotating the rotatable elongate mold core as well as the jack screw means when the invention is in a mold closed condition.

Another embodiment of the jack screw means 28 is depicted in FIGS. 4a and 4b. In this embodiment, the jack screw means 28 comprises a riser component 32; a riser chase component 40 surrounding said riser component 32, said riser component 32 being in a slidable relationship with the riser chase component 40, the riser chase component 40 being fixed thereto; and means 34 for preventing the riser component 32 from rotating as it moves the stripper plate 24 away from the stationary plate 26 to for ejecting the formed threaded component 72 and as it moves to allow the stripper plate 24 to return for molding another threaded component 72. In this embodiment, the means 34 for preventing the riser component 32 from rotating comprises at least one flat portion 36 along its outside perimeter, the flat portion 36 being juxtaposed a mating flat portion 42 in the riser chase component 40.

The unscrewing mechanism 10 for forming threaded components further comprises a fixed core cooling plate 44; and a bottom bearing plate 46 in overlying relationship to the fixed core cooling plate 44 and fastened to said fixed core cooling plate 44. The stationary plate 26 is in overlying relationship to the bottom bearing plate 46 and fastened to said bottom bearing plate 46 (see 48 in FIGS. 2a–2d and 3a–3b); and the at least one rotatable elongate mold core 12 is disposed on the fixed core cooling plate 44 at one end at 50 and extends therefrom through an aperture 52 in each of the bottom bearing plate 46, the stationary plate 26 and the stripper plate 24 such that the threaded portion 14 extends beyond an upper surface 54 of the stripper plate 24 when said stripper plate 24 is in condition for molding another threaded component 72 and the threaded portion 14 engages the mating mold 16 in the cavity plate 22 so as to define the mold cavity 18.

Bearing means 56 in each of the stationary plate 26 and bottom bearing plate 46 through which the at least one rotatable elongate mold core 12 extends is provided for facilitating a rotating action of the at least one rotatable elongate mold core 12 in a clockwise and counter-clockwise rotation.

The at least one rotatable elongate mold core 12 further comprises longitudinal gear teeth 58 around a perimeter of an intermediate portion of said at least one rotatable elongate mold core 12.

The means 20 for moving the stripper plate further includes an elongate drive gear 60, which is parallel to the at least one rotatable elongate mold core 12. The elongate drive gear 60 has longitudinal gear teeth around a perimeter of an intermediate portion of said elongate drive gear 60. The longitudinal gear teeth 62 of the elongate drive gear 60 are in cooperative gear teeth mesh engagement with the mating longitudinal gear teeth 58 of the at least one rotatable elongate mold core 12.

Figure 5A:
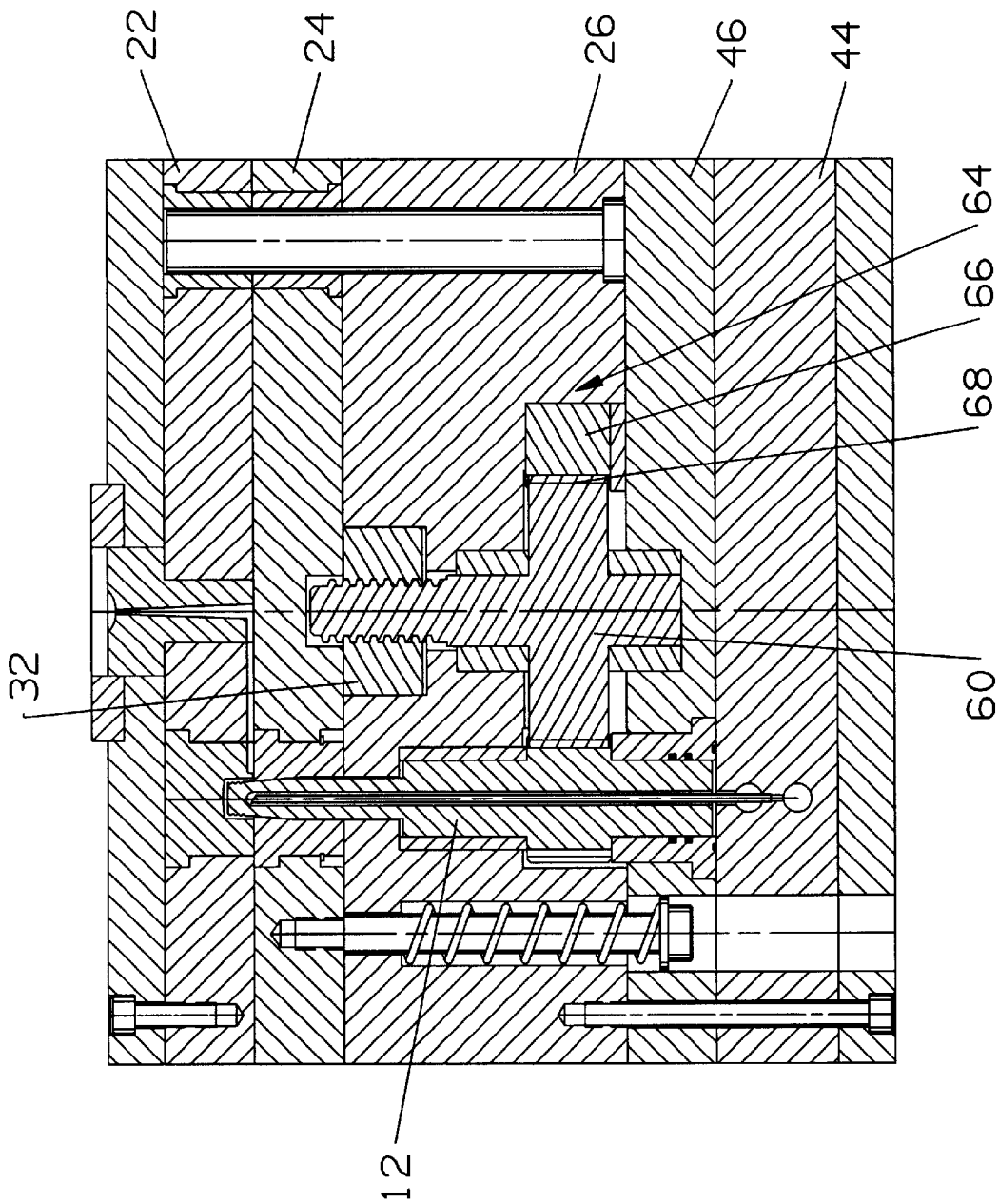
FIG. 5a is a cross-section view of the present invention wherein the means for driving the elongate drive gear is a rack system and the invention is in a mold closed condition.
Figure 5B:
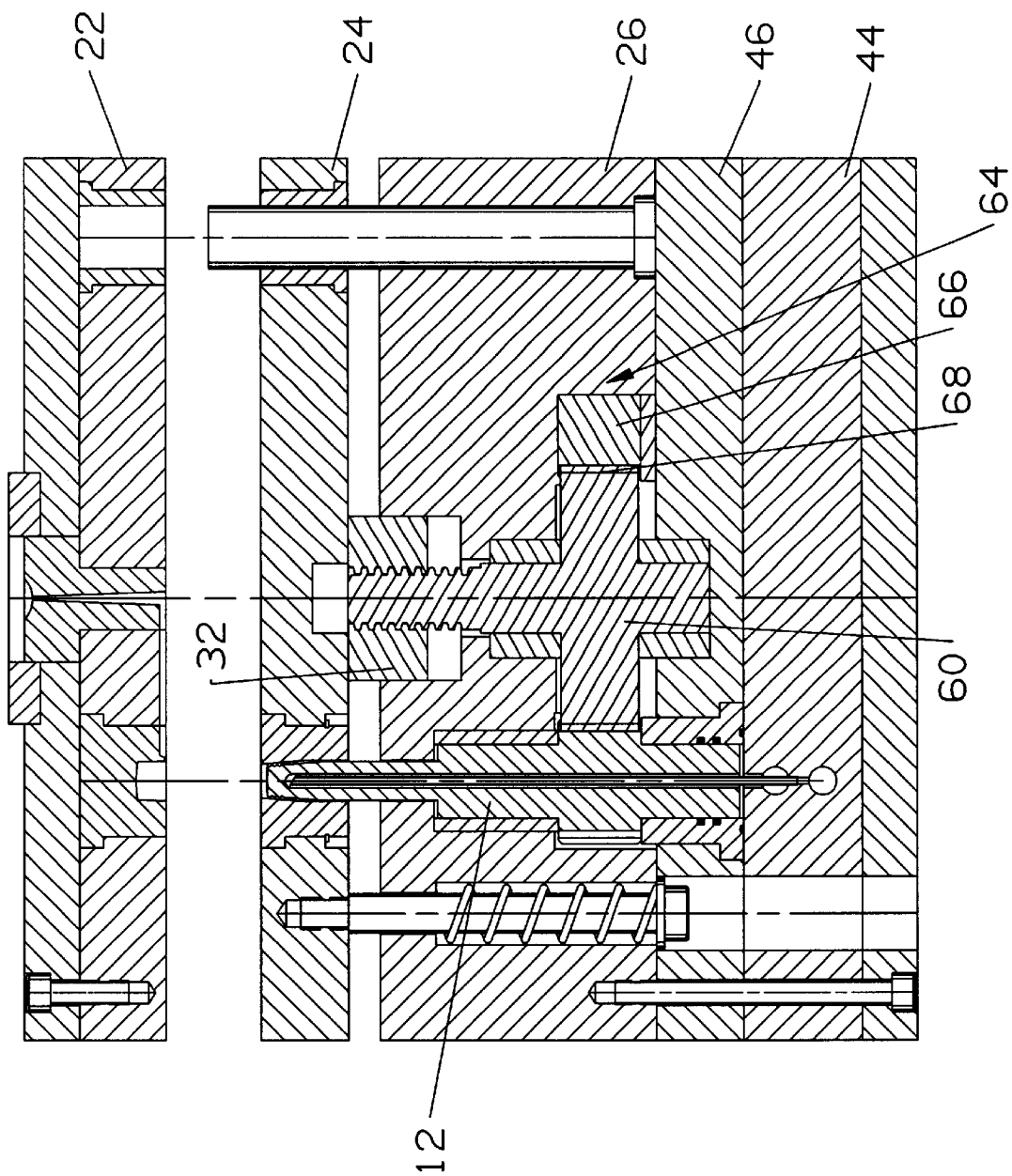
FIG. 5b depicts the embodiment of FIG. 5a with the present invention in the mold open condition.
Figure 6A:
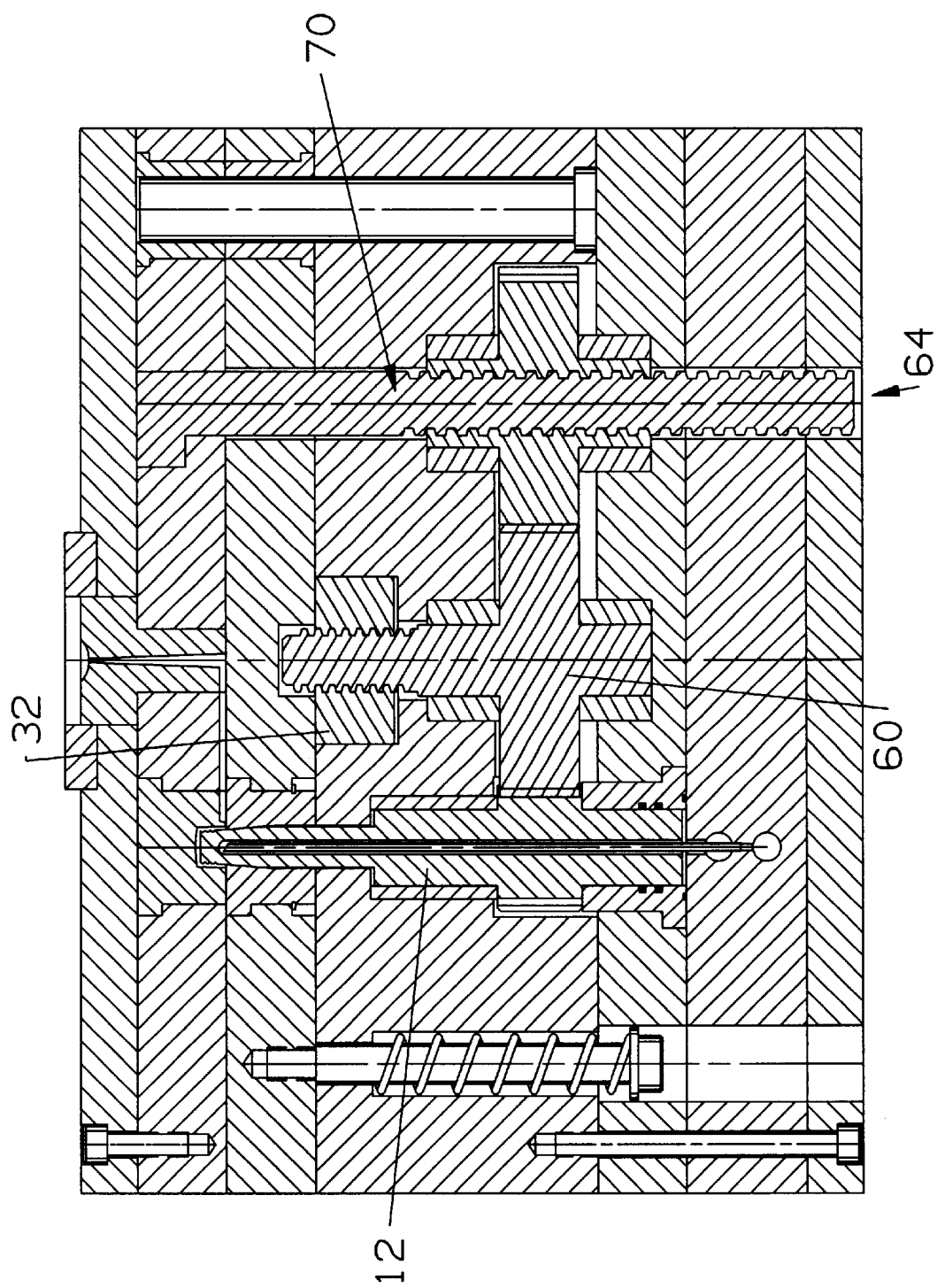
FIG. 6a is a cross-section view of the present invention depicting another example of providing the means for driving the elongate drive gear, wherein the means incorporates a Helical drive screw assembly and the invention is in a mold closed condition.
Figure 6B:
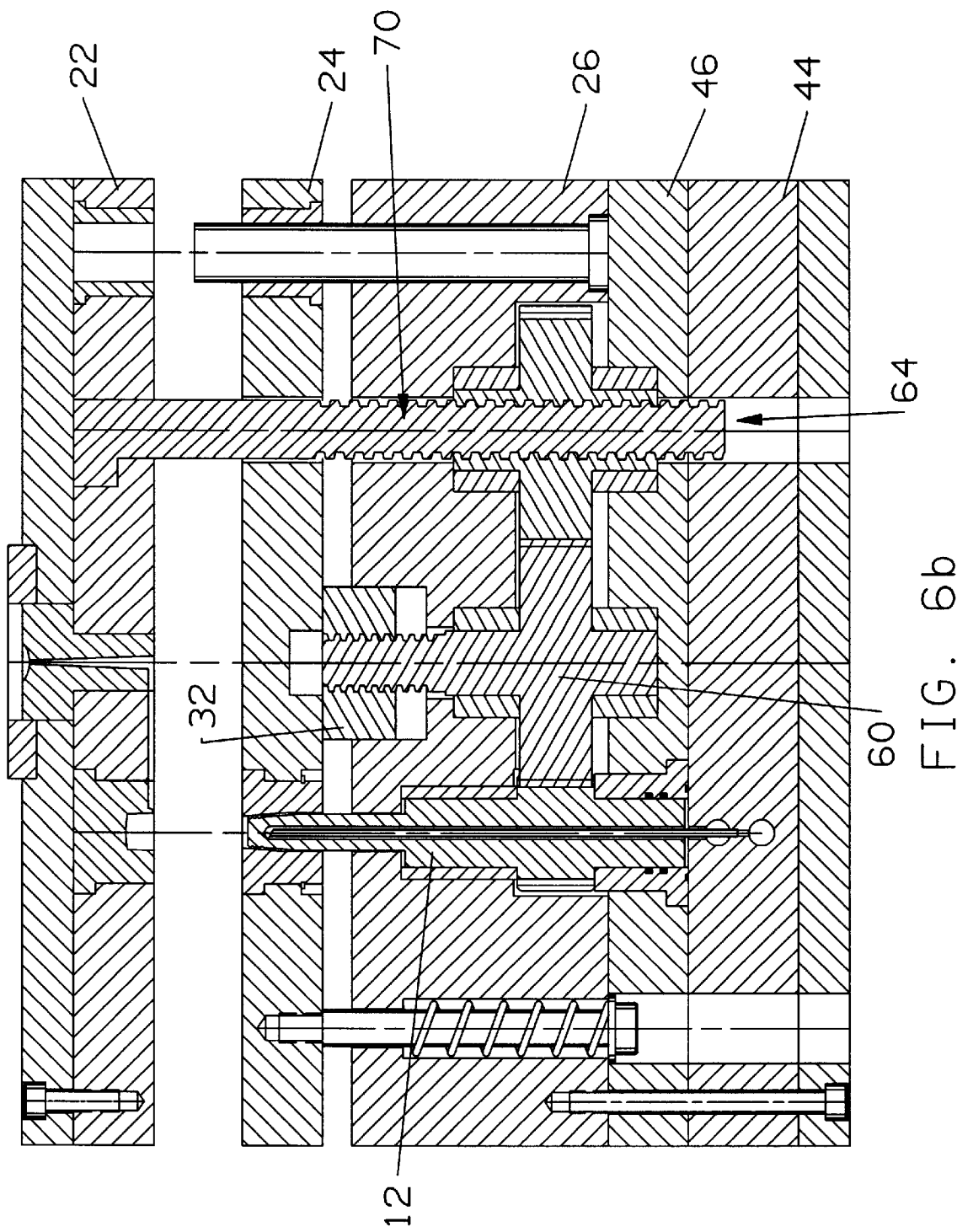
FIG. 6b depicts the embodiment of FIG. 6a with the present invention in the mold open condition.

Also provided is means 64 for driving the elongate drive gear 60 so as to cause clockwise and counter-clockwise rotation such that when the elongate drive gear 60 is made to rotate clockwise, the at least one rotatable elongate mold core 12 rotates counter-clockwise, and when the elongate drive gear 60 is made to rotate counter-clockwise, the at least one rotatable elongate mold core 12 rotates clockwise. There are several ways or methods known in the art to provide the means 64 for driving the elongate drive gear 60. FIGS. 5a and 5b depict mold closed and mold open conditions respectively, in which a rack gear 66 is utilized and the corresponding gear teeth mesh at 68. FIGS. 6a and 6b depict another example of providing means 64 for driving the elongate drive gear 60. These figures depict the use of a helical drive screw assembly 70 in respective mold closed and mold open conditions. The assembly 70 is in mechanical operative communication with the elongate drive gear 60. The use of this embodiment utilizing a helical drive screw assembly is commonly referred to in the industry as providing an "on the fly" ejection of the threaded component 72.

Figure 7A:
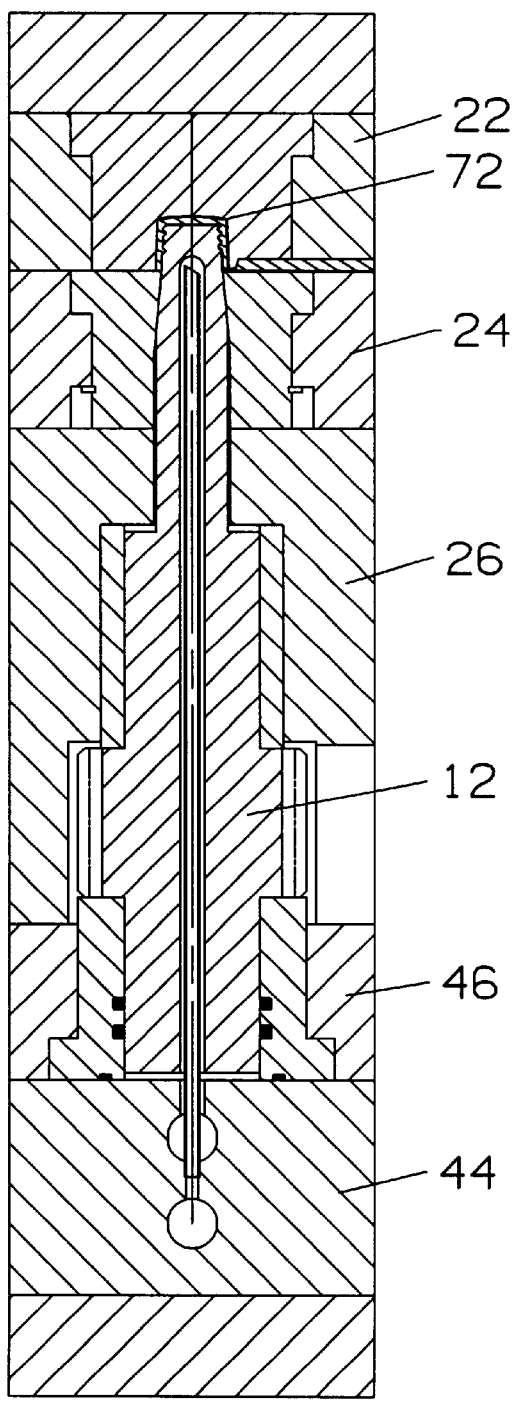
FIG. 7a depicts a partial cross-sectional view of the rotatable elongate mold core in a mold closed condition wherein a threaded cap (internal threaded component) is being manufactured.
Figure 7B:
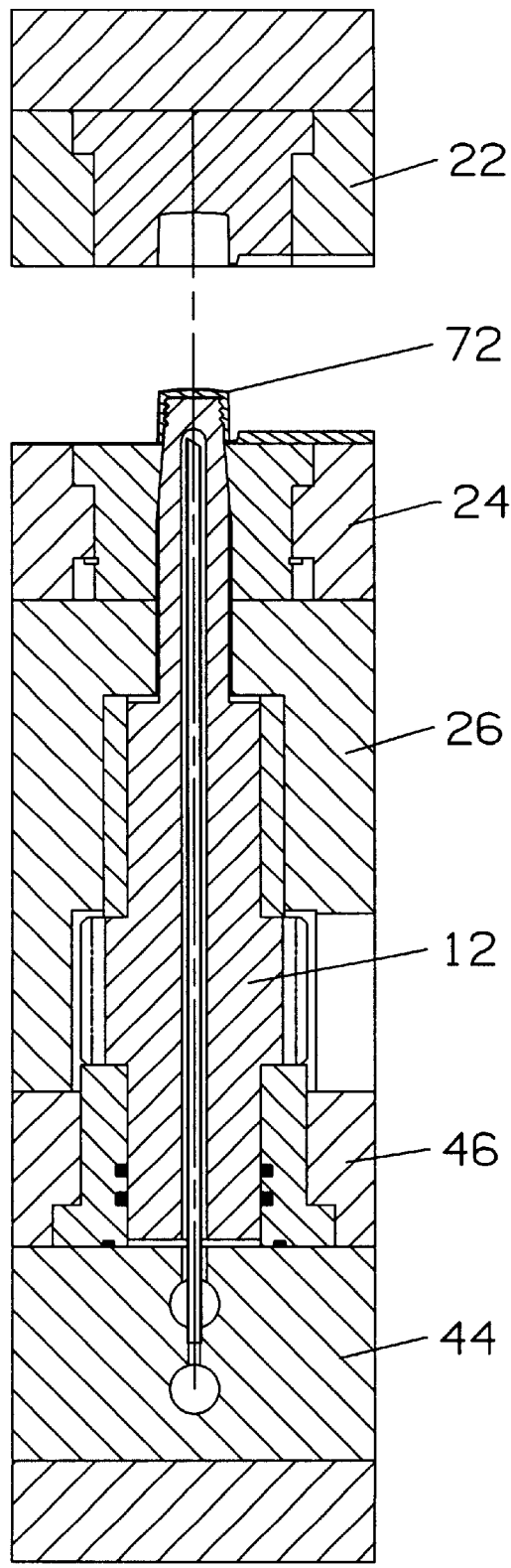
FIG. 7b depicts the embodiment of FIG. 7a with the invention in the mold open condition.
Figure 8A:
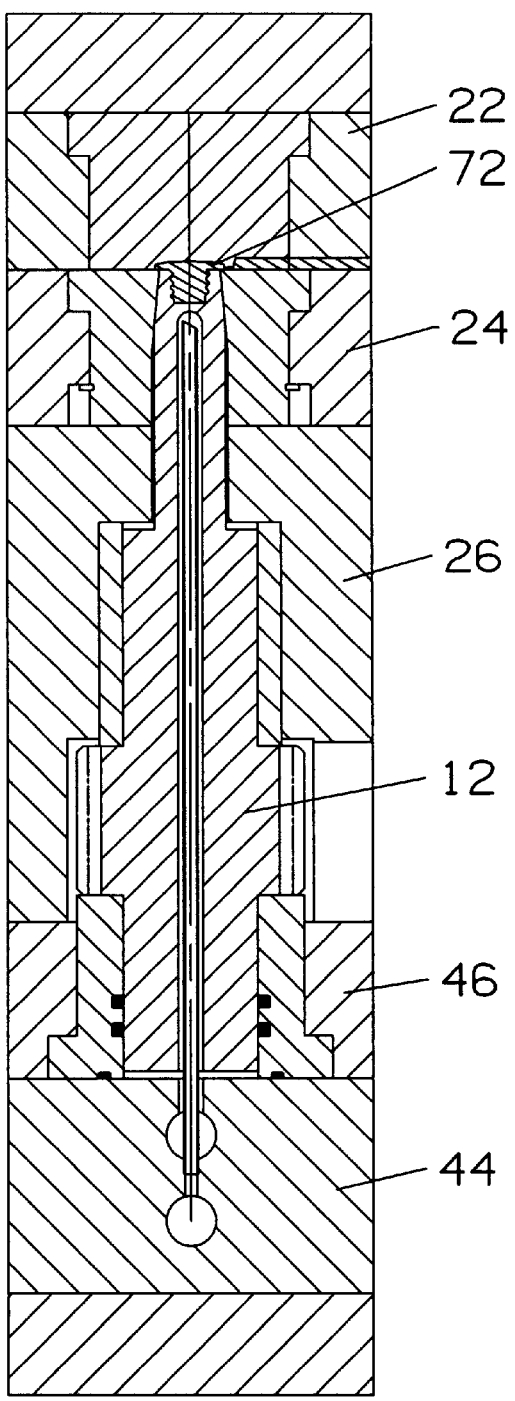
FIG. 8a depicts a partial cross-sectional view of the rotatable elongate mold core in a mold closed condition wherein a threaded plug (external threaded component) is being manufactured.
Figure 8B:
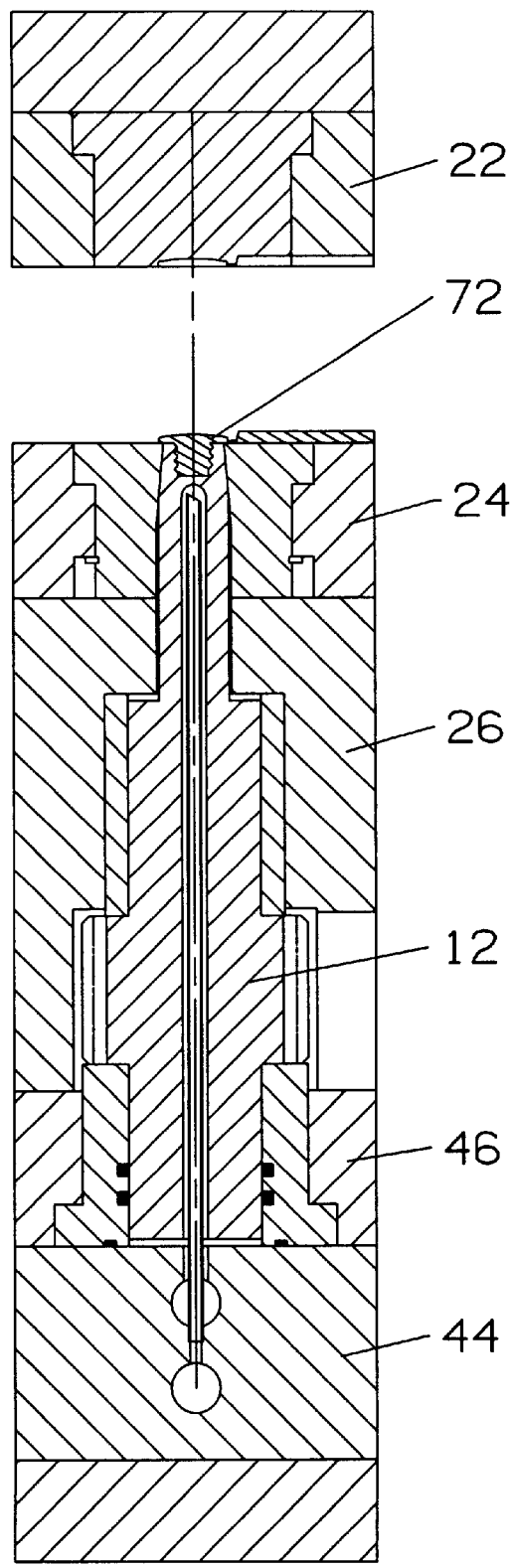
FIG. 8b depicts the embodiment of FIG. 8a with the invention in the mold open condition.

FIGS. 7a and 7b depict a partial cross-section view of the invention 10 in respective mold closed and mold open conditions, wherein a threaded component 72 is being manufactured with an internal thread. FIGS. 8a and 8b depict a partial cross-section view of the invention 10 in respective mold closed and mold open conditions, wherein a threaded component 72 is being manufactured with an external thread.

As seen from the foregoing description, the present invention satisfies a long felt need to provide an unscrewing mechanism for forming threaded components which is simpler in design, easier to maintain, provides a longer running time before maintenance or downtown, and increases production.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An unscrewing mechanism for forming threaded components comprising:
    at least one rotatable elongate mold core having a threaded portion at one end for molding a threaded component to be formed;
    a mating mold in an overlying relationship with each of said at least one rotatable elongate mold core when in a mold closed condition so as to define a mold cavity between said at least one rotatable elongate mold core and said mating mold into which molten material is injected to form said threaded component;
    said mating mold being a portion of a cavity plate and independently movable relative to said at least one rotatable elongate mold core to a mold open condition when said mating mold is spaced from said at least one rotatable elongate mold core;
    a stripper plate in overlying relationship to a stationary plate, the stripper plate being movable and separable from the stationary plate in a direction parallel to an axial direction of the at least one rotatable elongate mold core for ejecting the formed threaded component when in the mold open condition, the stripper plate further being in underlying relationship to said cavity plate when in the mold closed condition; and
    means for moving said stripper plate in the direction parallel to the axial direction of the at least one rotatable elongate mold core, said means further being for rotating the at least one rotatable elongate mold core such that a movement of the stripper plate is sequenced to eject the formed threaded component at the same time that the threaded portion of the at least one rotatable elongate mold core is unscrewed.

2. The unscrewing mechanism for forming threaded components according to claim 1, wherein the means for moving said stripper plate includes jack screw means, the jack screw means being threaded and metered so that the stripper plate is moved to eject the formed threaded component at the same rate that the threaded portion of the at least one rotatable elongate mold core unscrews.

3. The unscrewing mechanism for forming threaded components according to claim 2, wherein the jack screw means comprises:
    a riser component, said riser component being in a slidable relationship with the stationary plate; and
    means for preventing the riser component from rotating as it moves the stripper plate away from the stationary plate and as it moves to allow the stripper plate to return for molding another threaded component.

4. The unscrewing mechanism for forming threaded components according to claim 3, wherein the means for preventing the riser component from rotating comprises:
    at least one flat portion along its outside perimeter, the flat portion being juxtaposed a mating flat portion in the stationary plate.

5. The unscrewing mechanism for forming threaded components according to claim 2, wherein the jack screw means comprises:
    a riser component;
    a riser chase component surrounding said riser component, said riser component being in a slidable relationship with the riser chase component, the riser chase component being fixed thereto; and
    means for preventing the riser component from rotating as it moves the stripper plate away from the stationary plate to for ejecting the formed threaded component and as it moves to allow the stripper plate to return for molding another threaded component.

6. The unscrewing mechanism for forming threaded components according to claim 5, wherein the means for preventing the riser component from rotating comprises:
    at least one flat portion along its outside perimeter, the flat portion being juxtaposed a mating flat portion in the riser chase component.

7. The unscrewing mechanism for forming threaded components according to claim 1, further comprising:
    a fixed core cooling plate;
    a bottom bearing plate in overlying relationship to the fixed core cooling plate and fastened to said fixed core cooling plate;
    the stationary plate being in overlying relationship to the bottom bearing plate and fastened to said bottom bearing plate; and
    the at least one rotatable elongate mold core being disposed on the fixed core cooling plate at one end and extending therefrom through an aperture in each of the bottom bearing plate, the stationary plate and the stripper plate such that the threaded portion extends beyond an upper surface of the stripper plate when said stripper plate is in condition for molding another threaded component wherein said threaded portion engages the mating mold in the cavity plate so as to define the mold cavity.

8. The unscrewing mechanism for forming threaded components according to claim 7, further comprising:
    bearing means in each of the stationary plate and bottom bearing plate through which the at least one rotatable elongate mold core extends, for facilitating a rotating action of the at least one rotatable elongate mold core in a clockwise and counter-clockwise rotation.

9. The unscrewing mechanism for forming threaded components according to claim 1, wherein the at least one rotatable elongate mold core further comprises:
    longitudinal gear teeth around a perimeter of an intermediate portion of said-at least one rotatable elongate mold core.

10. The unscrewing mechanism for forming threaded components according to claim 9, wherein the means for moving said stripper plate further comprises:
    an elongate drive gear, the elongate drive gear being parallel to the at least one rotatable elongate mold core;

the elongate drive gear having longitudinal gear teeth around a perimeter of an intermediate portion of said elongate drive gear;

the longitudinal gear teeth of the elongate drive gear being in cooperative gear teeth mesh engagement with the mating longitudinal gear teeth of the at least one rotatable elongate mold core; and means for driving the elongate drive gear so as to cause clockwise and counter-clockwise rotation such that when the elongate drive gear is made to rotate clockwise, the at least one rotatable elongate mold core rotates counter-clockwise, and when the elongate drive gear is made to rotate counter-clockwise, the at least one rotatable elongate mold core rotates clockwise.

11. An unscrewing mechanism for forming threaded components comprising:

a fixed core cooling plate;

a bottom bearing plate in overlying relationship to the fixed core cooling plate and fastened to said fixed core cooling plate;

a stationary plate in overlying relationship to the bottom bearing plate and fastened to said bottom bearing plate;

a stripper plate in overlying relationship to the stationary plate;

at least one elongate mold core, the at least one elongate mold core being rotatable and disposed on the fixed core cooling plate at one end and rotatably extending therefrom through an aperture in each of the bottom bearing plate, the stationary plate and the stripper plate such that a threaded surface portion at an opposite end of the at least one elongate mold core extends beyond an upper surface of the stripper plate when said stripper plate is in a position for molding another component and said threaded surface portion being adapted to engage a mating mold in a cavity plate which defines a mold cavity in which material may be injected to form a threaded component while in a mold closed position;

bearing means in each of the stationary plate and bottom bearing plate through which the at least one elongate mold core extends, for facilitating a rotating action of the at least one elongate mold core in a clockwise and counter-clockwise rotation;

the at least one elongate mold core having longitudinal gear teeth around a perimeter of an intermediate portion of said at least one elongate mold core, the intermediate portion with longitudinal gear teeth being disposed in the stationary plate;

an elongate drive gear, the elongate drive gear being parallel to the at least one elongate mold core and rotatably disposed at a first end in the bottom bearing plate and rotatably extending therefrom through an aperture in the stationary plate;

bearing means in each of the stationary plate and bottom bearing plate through which the elongate drive gear extends, for facilitating a rotating action of the at elongate drive gear in a clockwise and counter-clockwise rotation;

the elongate drive gear having longitudinal gear teeth around a perimeter of an intermediate portion of said elongate drive gear, the intermediate portion with longitudinal gear teeth of the elongate drive gear being disposed in the stationary plate;

the longitudinal gear teeth of the elongate drive gear being in cooperative gear teeth mesh engagement with the mating longitudinal gear teeth of the at least one elongate mold core;

means for driving the elongate drive gear so as to cause clockwise and counter-clockwise rotation such that when the elongate drive gear is made to rotate clockwise, the at least one elongate mold core rotates counter-clockwise, and when the elongate drive gear is made to rotate counter-clockwise, the at least one elongate mold core rotates clockwise;

the stripper plate being separable from the stationary plate in a direction parallel to an axial direction of each of the at least one elongate mold core and the elongate drive gear;

the elongate drive gear having jack screw means at its second end for causing the stripper plate to separate from the stationary plate for releasing the formed threaded component as the elongate drive gear is made to rotate in a predetermined direction, and for causing the stripper plate to return for forming another threaded component as the elongate drive gear is made to rotate in a pre-determined opposite direction; and the jack screw means being threaded and metered so that the stripper plate is moved to eject the formed threaded component in the same sequence that the threaded surface portion of the at least one elongate mold core is unscrewed.

12. The unscrewing mechanism for forming threaded components according to claim 11, wherein the jack screw means comprises:

a riser component, said riser component being in a slidable relationship with the stationary plate; and means for preventing the riser component from rotating as it moves the stripper plate away from the stationary plate and as it moves to allow the stripper plate to return for forming another threaded component.

13. The unscrewing mechanism for forming threaded components according to claim 12, wherein the means for preventing the riser component from rotating comprises:

at least one flat portion along its outside perimeter, the flat portion being juxtaposed a mating flat portion in the stationary plate.

14. The unscrewing mechanism for forming threaded components according to claim 11, wherein the jack screw means comprises:

a riser component;

a riser chase component around said riser component, said riser component being in a slidable relationship with the riser chase component, the riser chase component being fixed thereto; and means for preventing the riser component from rotating as it moves the stripper plate away from the stationary plate for ejecting the formed threaded component and as it moves to allow the stripper plate to return for forming another threaded component.

15. The unscrewing mechanism for forming threaded components according to claim 14, wherein the means for preventing the riser component from rotating comprises:

at least one flat portion along its outside perimeter, the flat portion being juxtaposed a mating flat portion in the riser chase component.

* * * * *